Figure 1:
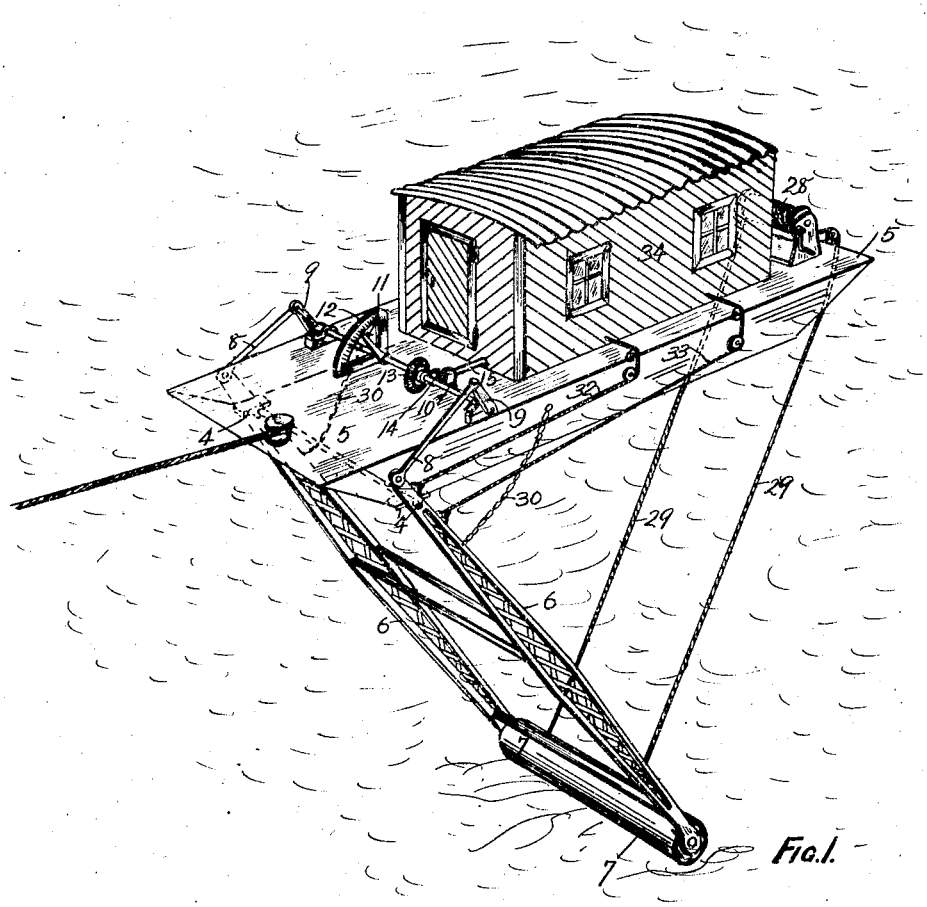

H. K. MARSHALL.
MARINE SOUNDING APPARATUS.
APPLICATION FILED NOV. 25, 1910.

1,016,923.

Patented Feb. 6, 1912.
3 SHEETS—SHEET 1.

Witnesses

Inventor
H. K. Marshall

H. K. MARSHALL.
MARINE SOUNDING APPARATUS.
APPLICATION FILED NOV. 25, 1910.

1,016,923.

Patented Feb. 6, 1912.

Witnesses

Inventor
H. K. Marshall

H. K. MARSHALL.
MARINE SOUNDING APPARATUS.
APPLICATION FILED NOV. 25, 1910.

1,016,923.

Patented Feb. 6, 1912.

3 SHEETS—SHEET 3.

Witnesses

Inventor
H. K. Marshall

UNITED STATES PATENT OFFICE.

HUGH KEITH MARSHALL, OF SYDNEY, NEW SOUTH WALES, AUSTRALIA.

MARINE SOUNDING APPARATUS.

1,016,923.  Specification of Letters Patent.  Patented Feb. 6, 1912.

Application filed November 25, 1910. Serial No. 594,218.

*To all whom it may concern:*

Be it known that I, HUGH KEITH MARSHALL, a subject of the King of Great Britain and Ireland, residing at 108 Cooper street, Sydney, in the State of New South Wales, Commonwealth of Australia, have invented certain new and useful Improvements in Marine Sounding Apparatus, of which the following is a specification.

This invention is devised with the object of taking a continuous sounding of the bottom of a sea, harbor, lake or river, and automatically recording the same upon a chart.

The essential features of the invention consist of a dependent frame pivoted to a vessel, preferably a barge or punt constructed for the purpose, and carrying at its lower extremity a roller designed to travel upon the bottom of the harbor or river as the vessel is propelled upon the surface. The frame does not hang vertically, so that the varying depth of water causes angular movement, which by the use of certain levers, shafts and pulleys, is communicated to a drum rotated thereby upon its axis in one direction or the other as the depth increases or decreases. A recording chart is fixed upon the said drum and a pencil point in contact therewith is caused to travel longitudinally thereon by means of a weight, its movement being controlled by a clock so that it travels a predetermined distance in a certain time and the chart being marked accordingly by a series of circumferential lines, the depth (as indicated by the pencil) at any hour is recorded. In addition a pointer working in conjunction with a graduated arc or quadrant enables the depth to be taken visually, simultaneously acting as a check upon the recording mechanism and as a standard from which the required position of a new chart upon the drum may be decided.

As it is advisable to retain the surface of the barge as nearly horizontal as possible a balance or compensation weight is provided thereon and designed to be moved forward or aft by the action of the sounding frame so as to counterbalance the varying weight of the latter upon one end of the barge as it assumes various angles. For the purpose of enabling the relative position of the barge to the horizontal to be ascertained a spirit level and inclinometer are provided.

In order to indicate the practical application of this invention reference will now be made to the accompanying drawings in which:—

Figure 2:
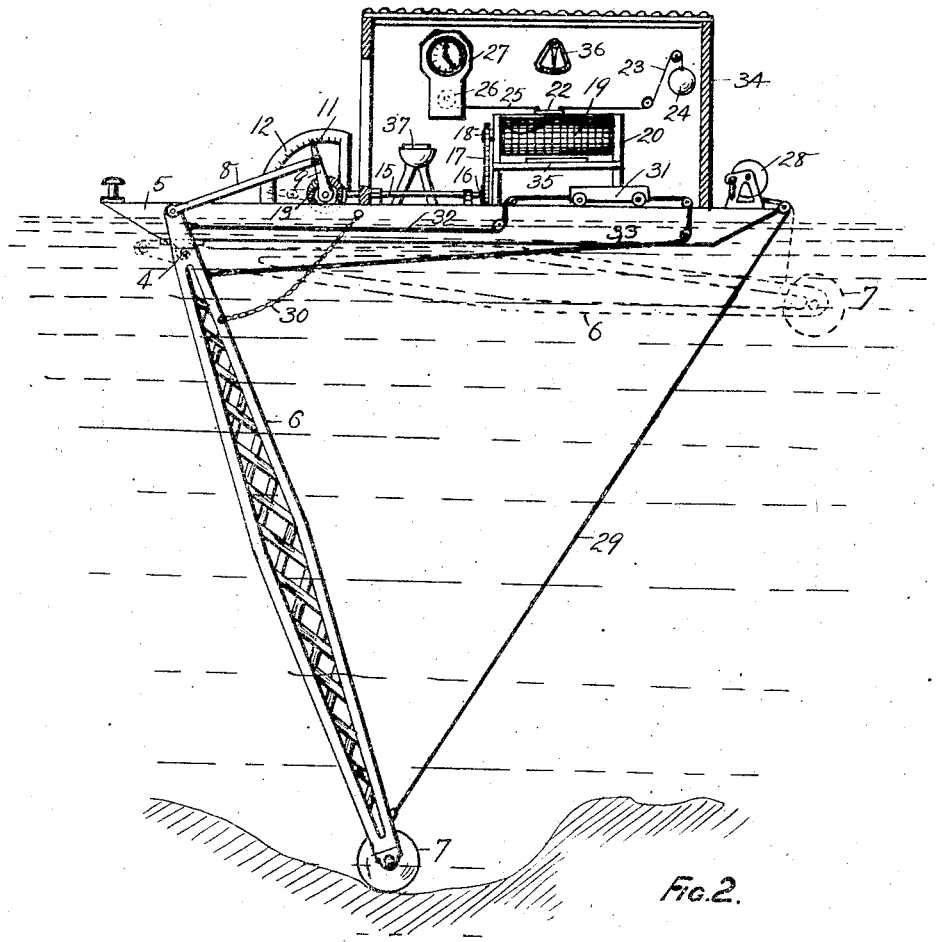
Figure 3:
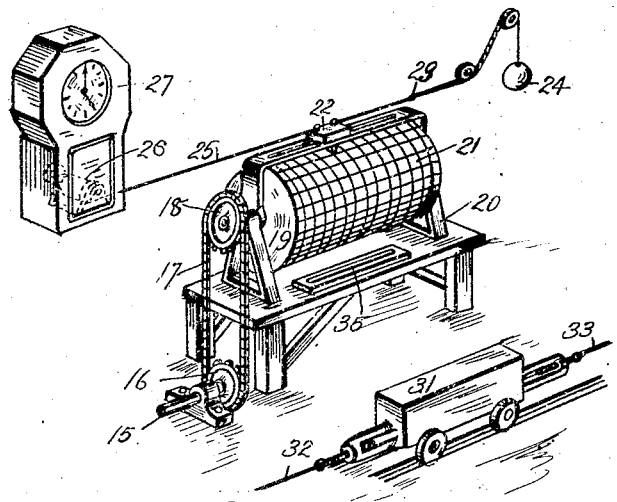
Figure 4:
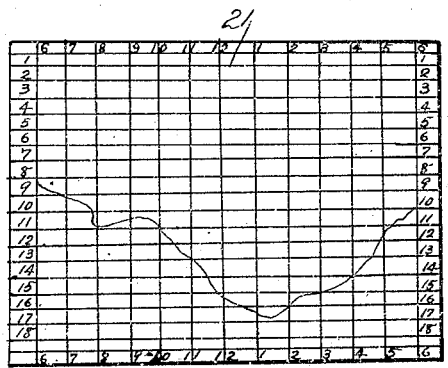

Figure 1 is a perspective view of a barge or punt fitted with the sounding apparatus described herein. Fig. 2 is a part sectional view of the same. Fig. 3 is a detail showing the recording drum with chart, clock and balance-weight. Fig. 4 is a view of a diagrammatic chart.

The punt 5 has pivoted thereto at 4. 4. as near to the bottom thereof as possible, the members 6. 6. of the sounding frame (one on each side) carrying between them at their lower extremities the roller 7. To extensions of the upper ends of the members 6. 6. are pivoted the rods 8. 8. connecting with levers 9. 9. mounted upon the extremities of the transverse shaft 10. Upon this shaft is mounted the pointer 11 arranged to work against the graduated face of the arc or quadrant 12. Also upon the said shaft is mounted the bevel wheel 13 gearing with the bevel pinion 14 mounted upon one end of the longitudinal shaft 15 upon the other end of which is the pulley 16. This pulley actuates by means of a belt or sprocket chain 17 the pulley 18 mounted upon one end of the axle of the drum 19 supported upon a frame 20. This drum carries the chart 21, divided by longitudinal and transverse lines (the latter becoming circumferential when wound upon the drum) the former indicating depth and the latter time and each numerated accordingly by marginal figures (see Fig. 4).

A pencil is held in the carrier 22 which is connected at one end by a cord 23 to a weight 24 and at the other end by a cord 25 to a drum 26 attached to a clock 27 so that the mechanism of the clock will rotate the drum and pay out the cord, the weight thereupon traversing the carrier. If considered advisable the weight 24 may be made to provide the required energy to actuate the clock.

A winch 28 is provided at the stern of the barge for the purpose of raising the free end of the sounding frame when desired into the position indicated by dotted lines in Fig. 2 by means of the ropes 29. 29. connected thereto. Check chains 30 are provided to prevent the frame from assuming a vertical position which would be likely to cause damage when working in anything but perfectly smooth water.

The balance-weight 31 is designed to move upon rails and is connected by cords 32 and 33 arranged upon suitable pulleys to one or both of the members 6. 6. at points above and below the pivot respectively, so that the movement of the free end of the sounding frame toward or from the vertical will move the balance-weight correspondingly backward and vice versa.

The operative recording mechanism is preferably inclosed in a housing 34 and a spirit level 35, inclinometer 36 and compass 37 are provided to assist in the effective working of the barge for obtaining correct soundings.

The operation of the appliances will readily be understood from the foregoing and it will be seen that as the roller 7 has a length equal to the full width of the barge the soundings taken cover a wide path in each passage and the work is consequently expedited, while the readings taken indicate the minimum depth of water at any point within that path as a pinnacle of rock (for example) will raise the sounding frame as effectively as would a shelf or ledge extending the full width of the path.

What I claim and desire to secure by Letters Patent is:—

1. In a marine sounding apparatus, a floating structure, a sounding frame pivotally supported intermediate of its length from said floating structure and extending therebelow into the water downwardly and rearwardly and contacting the bed of the water at its lower end, a rotating recording drum carried on said floating structure, and means operatively connected to said frame above its pivot point and adapted to rotate said recording drum exactly proportional to the changes in depth of the water as denoted by the swinging of said sounding frame.

2. In a marine sounding apparatus, a floating structure, a pair of depending arms pivoted to the forward end of said structure one on each side thereof and having extensions beyond the pivot point, a ground roller journaled in the lower extremities of said arms and extending horizontally therebetween, a recording apparatus, and means operatively connecting said recording apparatus with said extensions.

3. Improvements in marine sounding apparatus consisting of a ground roller pivotally mounted transversely between the lower extremities of the members of a dependent frame pivoted to a floating structure, a rotatably mounted drum carrying a recording chart and operated and controlled by the said frame by means of levers and gearing, all substantially as described and illustrated.

4. Improvements in marine sounding apparatus consisting of a ground roller pivotally mounted transversely between the lower extremities of the members of a dependent frame pivoted to a floating structure, a rotatably mounted drum carrying a recording chart and operated and controlled by the said frame by means of levers and gearing, and a balance weight operated and controlled by the said frame, all substantially as described and illustrated.

5. In a marine sounding apparatus, a floating structure, a pair of depending arms pivoted one at each side of said structure at the forward end thereof and having extensions beyond the pivot point a ground roller journaled at the lower extremities of said arms and extending therebetween, a rotatable drum mounted on said structure and carrying a recording chart on its periphery, levers and gears operatively connecting said extensions with said drum for rotating the latter coincidently with the movement of said depending arms, a marker in contact with said chart, and means for constantly and uniformly moving said marker in an axial direction across said chart.

6. In a marine sounding apparatus, a floating structure, a frame pivoted to the forward end of and depending below said structure and carrying a ground roller at the lower end thereof, a counterbalance weight slidable longitudinally on said floating structure, a rope operatively connecting one end of said weight to the frame above the pivot point, and a rope operatively connecting the other end of said weight to the frame below the pivot point for the purpose herein described.

Signed at Sydney, New South Wales, Commonwealth of Australia, this 15th day of October 1910.

HUGH KEITH MARSHALL.

Witnesses:
CHAS. HATTON,
WM. NEWTON.